Figure 1:
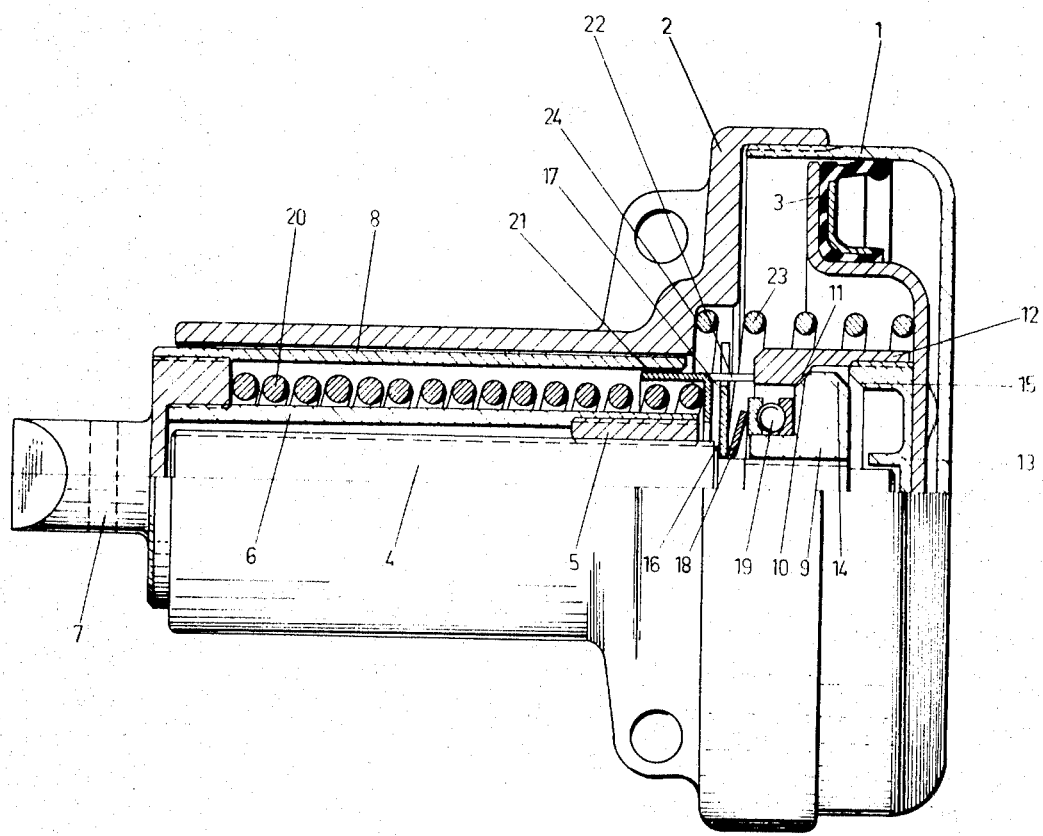

United States Patent [19]
Sander

[11] 3,744,596
[45] July 10, 1973

[54] PNEUMATIC CYLINDER-PISTON UNIT FOR RAILWAY BRAKE RIGGINGS

[75] Inventor: Nils Borje Lennart Sander, Malmo, Sweden

[73] Assignee: Svenska Aktiebolaget Bromsregulator, Malmo, Sweden

[22] Filed: Dec. 27, 1971

[21] Appl. No.: 212,347

[30] Foreign Application Priority Data
Jan. 12, 1971 Great Britain.................. 1,346/71

[52] U.S. Cl.............................. 188/203, 188/196 D
[51] Int. Cl............................................. F16d 65/66
[58] Field of Search............... 188/59, 71.9, 196 D, 188/202, 203

[56] References Cited
UNITED STATES PATENTS
3,043,406  7/1962  Larsson......................... 188/196 D
3,482,662  12/1969  Bruhn et al..................... 188/196 D

*Primary Examiner*—Duane A. Reger
*Attorney*—Laurence R. Brown

[57] ABSTRACT

A pneumatically operated slack adjuster is used on an auxiliary light inexpensive brake pad used along with disc brakes on a railway wheel to clean the surface of the wheel and has two telescopically related displaceable parts, one a spindle with screw threads and the other a tubular rod with a nut threaded on the spindle with a non-locking pitch. Slack may be taken up in one or both directions when radially extending clutch surfaces are released during a braking stroke or release. The piston actuates an adjuster spring by transmitting a force to the tubular rod.

5 Claims, 8 Drawing Figures

PNEUMATIC CYLINDER-PISTON UNIT FOR RAILWAY BRAKE RIGGINGS

This invention relates to a pneumatic cylinder-piston unit of the kind (herein called "the kind defined") used for a railway vehicle brake rigging and provided with a built-in slack adjuster for maintaining proper slack between braking surfaces, the said slack-adjuster comprising two telescopically relatively displaceable rod parts, one of which is a spindle having screw-threads, the other rod part being tubular and rigidly connected to a nut threaded on said spindle, the threads of the nut and spindle being of such pitch as to be non-self-locking.

Cylinder-piston units of the kind defined have been used for actuating so-called "short" brake riggings, using a vehicle wheel rim or a disc as one of the braking surfaces.

The present invention is intended to provide a cylinder-piston unit of the kind defined which may be of a very light design and suitable for an auxiliary brake rigging, for example adapted for pressing a composition brake block against a wheel of a vehicle mainly in order to keep the wheel rim clean. This is of importance in orderto ensure a constant and high coefficient of friction between the wheel rim and the rail in cases where the main brake effect is obtained by disc brakes. However, a very light cylinder-piston unit may be used advantageously for a very light and compact main or sole disc brake rigging. A further object is to provide a cylinder-piston unit which may be of economical manufacture so that a large number of small brake units on a single vehicle may be commercially acceptable.

According to the present invention a pneumatic cylinder-piston unit of the kind defined herein is characterised in that the said spindle is provided with radially-extending clutch surfaces adapted to co-operate with corresponding clutch surfaces on the piston of the unit upon relative axial movements between the said spindle and the piston, and an adjuster spring is mounted in a force transmission system between the piston and the said tubular rod part.

Figure 2:
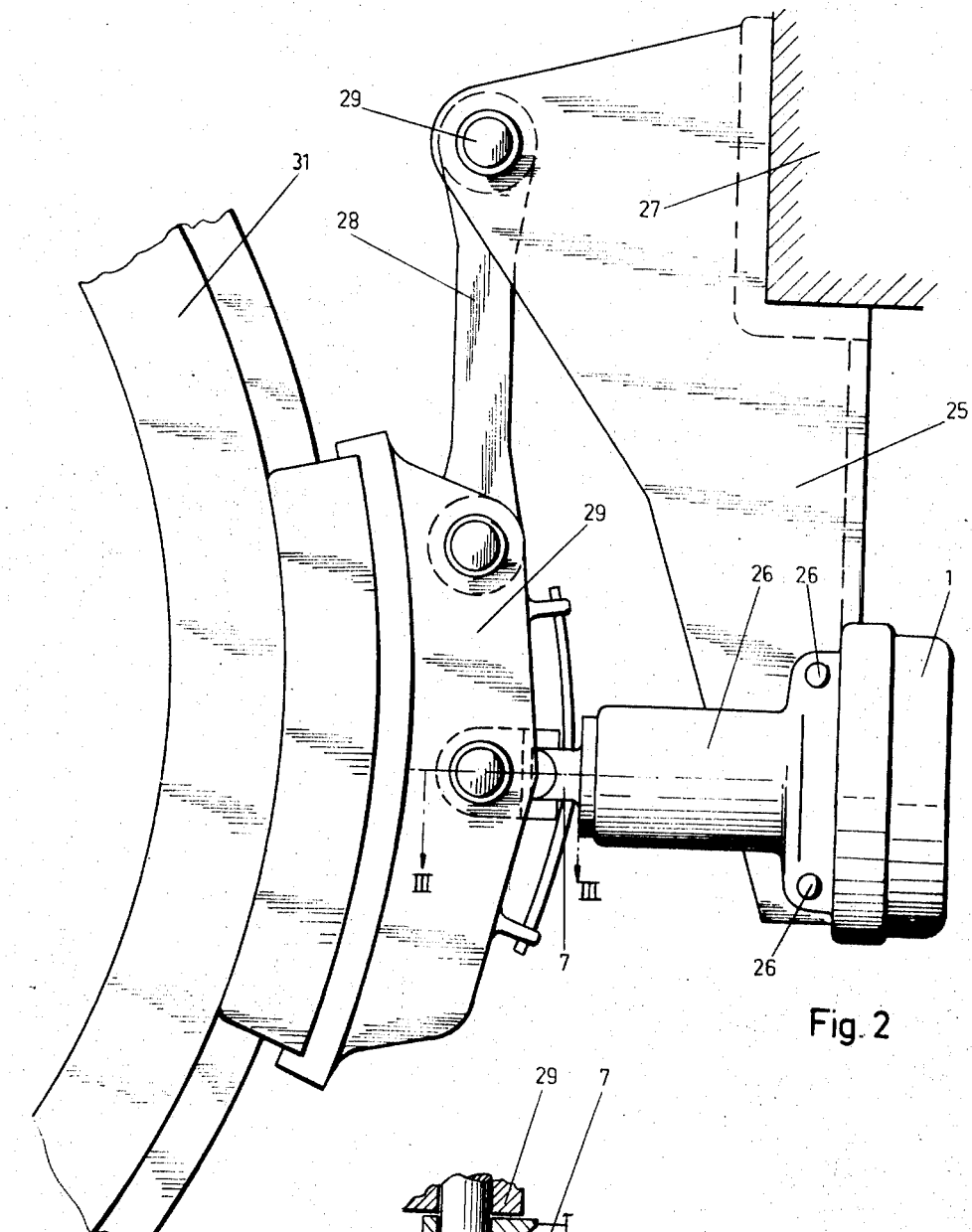
Figure 3:
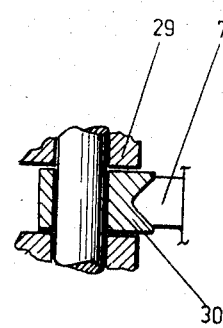
Figure 4:
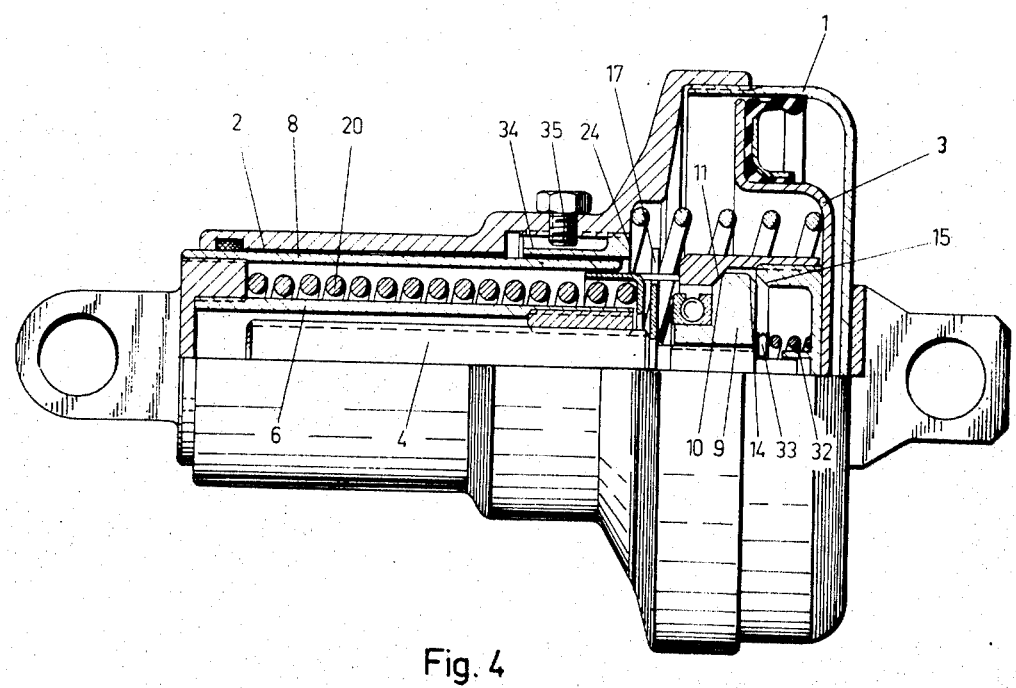
Figure 5:
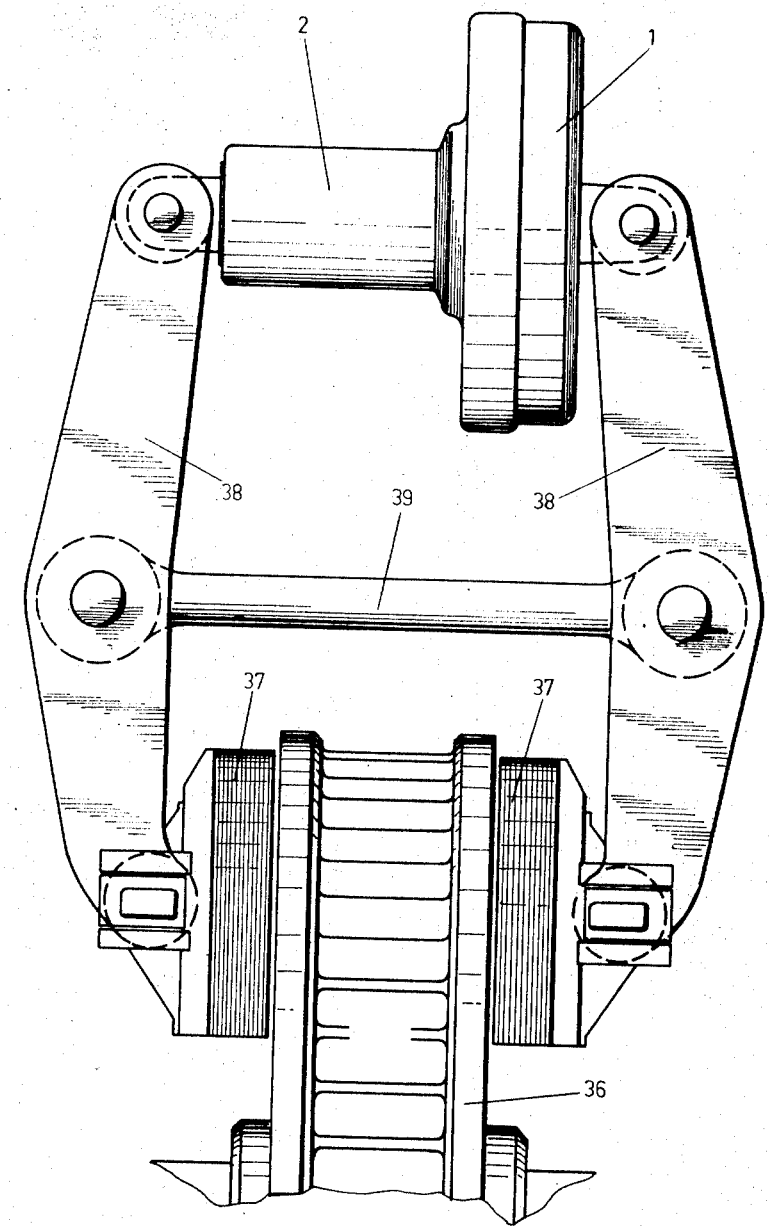
Figure 6:
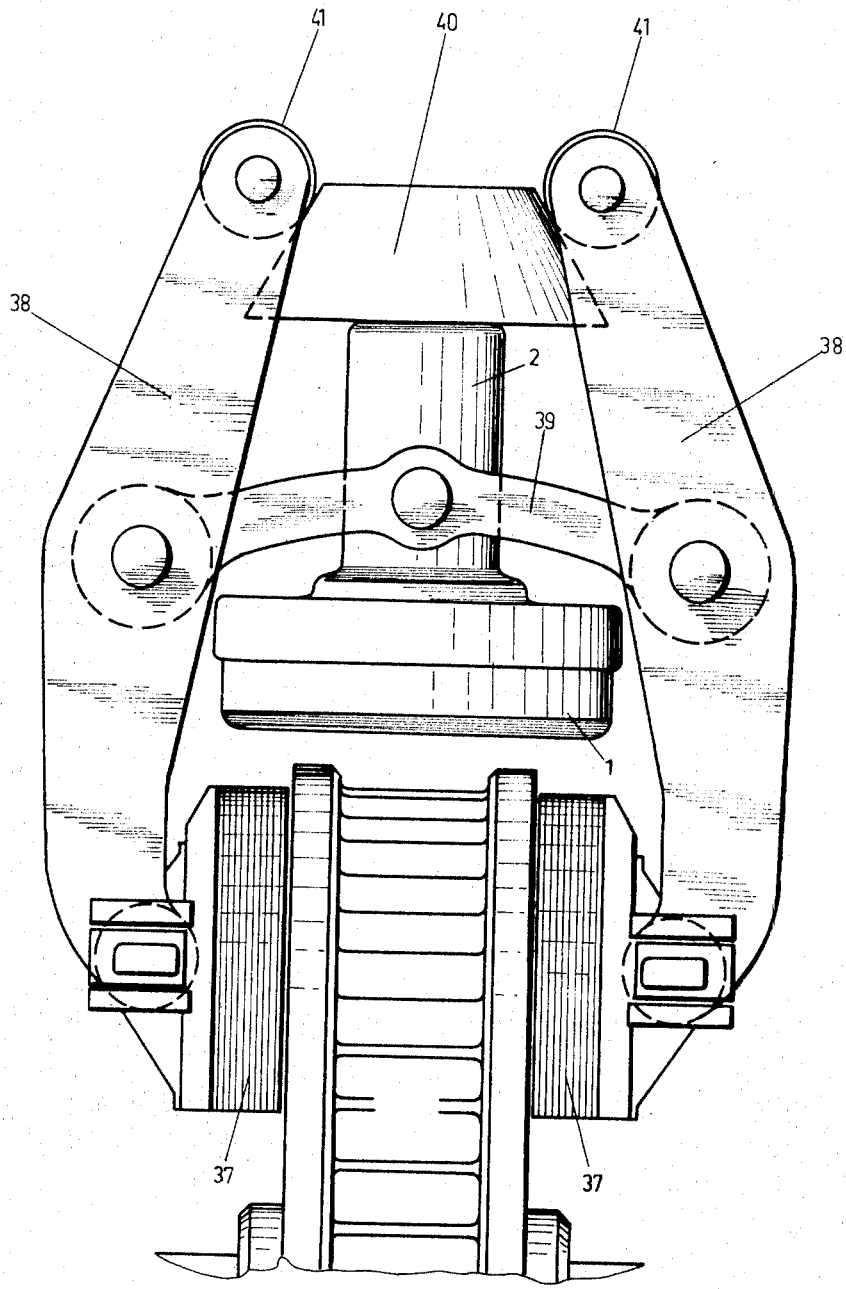
Figure 7:
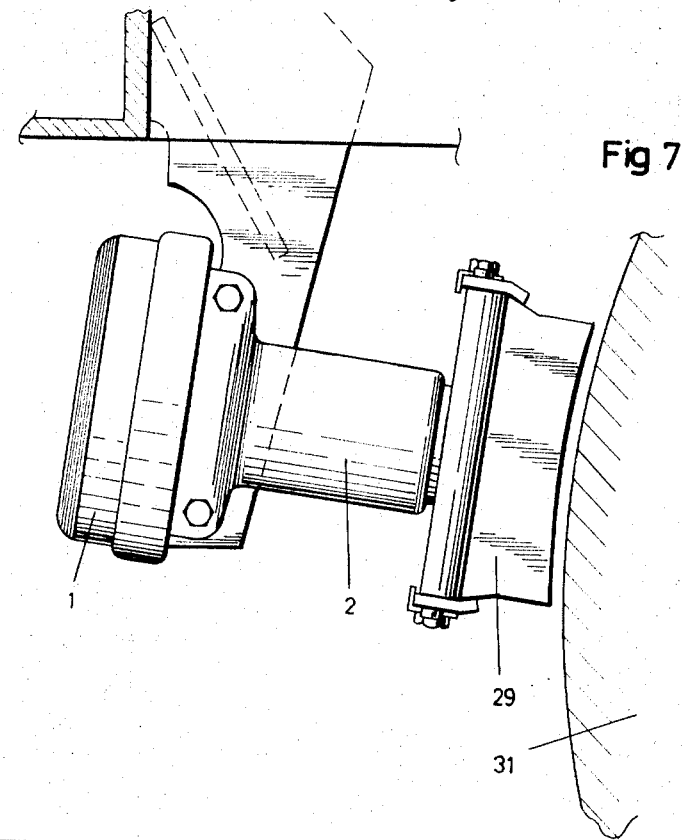
Figure 8:
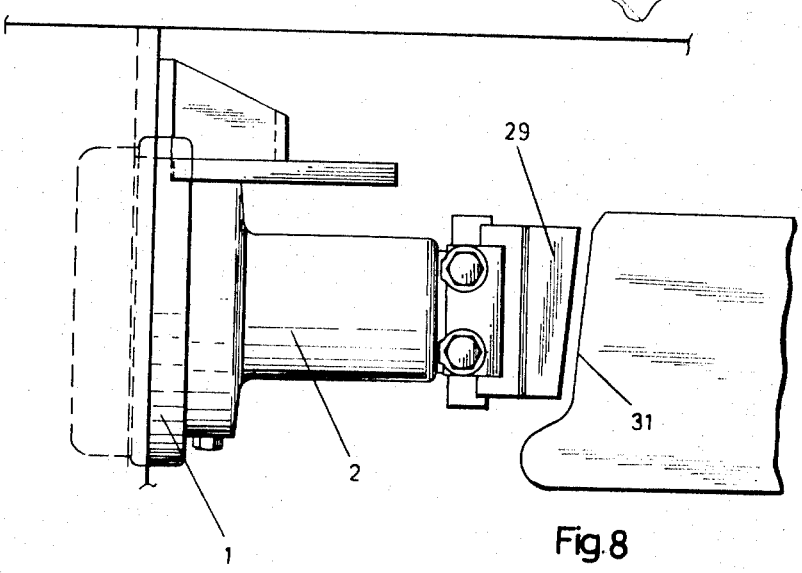

The invention is defined in the claims hereinafter, and how it may be performed is described in more detail with reference to the accompanying drawings, in which FIG. 1 shows a cylinder-piston unit according to theinvention partly in axial section, FIG. 2 shows a brake rigging in wich the unit of FIG. 1 is used, FIG. 3 is a detail view in horizontal section along the line III—III of FIG. 2, FIG. 4 shows another embodiment of a cylinder-piston unit according to the invention partly in axial section, FIG. 5 shows a disc brake rigging in which the unit of FIG. 4 is used, FIG. 6 shows another disc brake rigging using a unit according to the invention, and FIGS. 7 and 8 illustrate in views from above and the side respectively the use of a unit according to the invention for keeping a wheel rim clean.

Referring first to FIG. 1, the cylinder-piston unit comprises a cylinder 1 provided with a cover 2 and accommodating a piston 3. The unit is provided with a slack-adjuster having two telescopically displaceable rod parts - one of which is a spindle 4 having screw-threads of such pitch as to be non-self-locking with a correspondingly threaded nut 5 which is carried thereon and is rigidly connected to the other rod part which is a tubular rod part consisting of a tube 6, a push member 7 and a guide tube 8, the latter being guided in a bore in the cover 2, the tubular rod part being telescopically displaceable relative to the spindle 4.

The spindle 4 carries a flange 9 having a forwardly directed conical clutch surface 10 adapted to co-operate with a corresponding rearwardly directed clutch surface 11 on a sleeve 12 secured to a flanged boss 13 which is rigidly connected to the piston 3. The flange 9 is also provided with a rearwardly directed conical clutch surface 14 adapted to co-operate with an adjacent clutch surface 15 on the flanged boss 13.

The spindle 4 is provided with a shoulder surface 16, a spider sleeve 17 and a belleville washer 18 being clamped between said shoulder 16 and an axial low-friction bearing 19 mounted on the flange 9.

An adjuster spring 20 is held partly compressed between a rearwardly directed shoulder surface on the push member 7 and a spring support 21 having several fingers 22 (only one of which is shown in FIG. 1) passing through the spider sleeve 17 and engaging a forwardly directed shoulder surface on the sleeve 12.

A return spring 23 is held partly compressed between a rearwardly directed shoulder surface 24 on the cover 2 and the piston 3, thus urging the latter towards the right-hand as viewed, i.e., rearwardly or in the direction towards the fully released brake position.

The unit shown in FIG. 1 will operate as follows :

When compressed air is introduced behind the piston 3 the latter will move towards the left-hand as viewed, i.e., forwardly from the released brake position shown. The force of the adjuster spring 20 is transmitted from the forward end of the spring 20 through the following elements - the push member 7, the tube 6, the nut 5, the spindle 4, the flange 9, the clutch surfaces 10, 11, the sleeve 12, the fingers 22 and the spring support 21 — to the rear end of the spring 20. Thus the brake force exerted by the piston 3 will be transmitted to the push member 7 through a force transmission system comprising the spring 20. The spring 20 is mounted in the said system between the piston 3 and the tubular rod part.

All the above mentioned force transmitting elements will move forwardly together as long as the transmitted brake force does not exceed the force of the pre-stressed compression spring 20.

However, as soon as the braking surfaces (not shown in FIG. 1) engage each other, the transmitted brake force will increase to become equal to the force of the spring 20.

The spindle 4, the flange 9 and the tubes 6 and 8 will then remain stationary while the piston 3, the sleeve 12 and the spring support 21 will move forwardly, further compressing the spring 20 and separating the clutch surfaces 10 and 11.

When there is normal slack in the rigging the spider sleeve 17 will contact the shoulder surface 24 and prevent further forward movement of the spindle 4 and the flange 9. As the piston 3 continues its forward movement the clutch surfaces 14 and 15 will be engaged. The brake force is now transmitted also through the surfaces 14 and 15 to the flange 9, the spindle 4, the nut 5, and the tube 6 to the push member 7. During any further forward movement of the piston 3 caused by elasticity in the rigging the spider sleeve 17 and the belleville washer 18 will be subject to elastic deformations.

During the release of the brakes the above-described movements will be effected in reverse order to restore the unit to the illustrated condition.

If the slack in the brake rigging has become excessive — for example due to worn braking surfaces — the spider sleeve 17 will during the next brake application reach the shoulder surface 24 prior to the transmission of a brake force exceeding the force of the spring 20. The spindle 4 and the flange 9 will now be prevented from further forward movement and the clutch surfaces 10 and 11 will separate. The spring 20 is now able to expand in the direction away from its support 21 and push the tubes 6 and 8 and the push member 7 forwardly while the spindle 4 and flange 9 are rotating on the antifriction bearing 19 pressing against the washer 18. The forward movement of the tubes 6 and 8 will continue until the braking surfaces have become engaged and the transmitted brake force has increased to exceed that of the spring 20, thus causing engagement of the clutch surfaces 14 and 15. The slack has now been restored to the desired value and the rest of the brake application operation as well as the following brake release operation is performed as described previously.

FIGS. 2 and 3 show a brake rigging in which the unit of FIG. 1 is used.

The cover 2 is secured to a bracket 25 by means of bolt connections 26. The bracket 25 is secured to a part 27 of the vehicle frame. A brake shoe hanger 28 is pivotally connected at 29 to the bracket 25 and carries a brake shoe 29. The push member 7 is of V-shape in horizontal section as shown in FIG. 3, and engages a correspondingly V-shaped element 30 pivotally connected to the brake shoe 29. A wheel rim 31 serves as a braking surface engaged by a brake block in the shoe 29.

The embodiment shown in FIG. 4 differs from that shown in FIG. 1 substantially in two respects. The first modification is the provision of a spring 32 and a low-friction axial bearing 33 between a rear shoulder surface on the flange 9 and the boss 13. This modification makes the adjuster function double-acting, i.e., the adjuster is not only able to automatically reduce an excessive slack but it is also able to increase a slack which has been too small — e.g., because a new brake block has been mounted to replace a worn-out brake block. The second modification consists in arranging the shoulder surface 24 on an adjustable sleeve 34 which is held in position by a locking pin 35.

The operation of the unit shown in FIG. 4 is the same as that of FIG. 1 when there is normal or excessive slack. In a case of insufficient slack between the braking surface (not shown) the operation is as follows:

During application of the brake the piston 3 is moved forwardly and the force transmitted will exceed that of the spring 20 prior to the contact between the spider sleeve 17 and the shoulder surface 24. The spring 20 will now be compressed and the clutch surfaces 10 and 11 will become disengaged. The piston 3 will now be able to continue its forward movement while the tubes 6 and 8 are stationary and the spindle 4 is following the forward movement of the piston 3 while being rotated and while the spring 20 is compressed. The rotation of the spindle 4 is caused by the axial force of the spring 32 which is comparatively weak in relation to the spring 20. As soon as the spider sleeve 17 contacts the surface 24 and the axial force obtained between the spider sleeve 17 and the surface 24 exceeds the force of the spring 32 the clutch surfaces 14 and 15 will engage and stop further rotation of the spindle 4, and thus prevent further relative axial movement between the spindle 4 and the tube 6. The slack has now been restored to the desired value. The desired value of the slack depends on the axial distance between the spider sleeve 17 and the surface 24 and this distance may be adjusted by loosening the locking pin the surface axially displacing the sleeve 34, and then securing by the pin 35.

The unit shown in FIG. 4 could be used, for example, in a rigging of the type shown in FIG. 5. Here an axle-mounted brake disc 36 is adapted to be engaged by brake pads 37 moved through a pair of levers 38 interconnected by a yoke 39. The cylinder-piston unit of FIG. 4 is mounted pivotally between the ends of the levers 38 remote from the pads 37.

FIG. 6 shows how a cylinder-piston unit 1, 2 according to the invention is mounted pivotally to a yoke 39 of a caliper disc brake rigging. The cylinder-piston unit applies force to a wedge member 40 engaging a pair of rollers 41 mounted at the ends of the levers 38 remote from the pads 37.

FIGS. 7 and 8 show how a cylinder-piston unit 1, 2 according to the invention may be used for directly applying a light brake block 29 against a wheel rim 31 without using a brake shoe hanger. This is a simple and cheap arrangement which is possible in case only small brake forces are desired, for example on a disc braked vehicle in which the light brake block 29 engaging the wheel rim 31 serves mainly to keep the wheel rim clean in order to maintain a constant coefficient of friction between the wheel rim and the rail.

I claim:

1. Slack adjusting apparatus for a brake rigging comprising in combination, a cylinder piston transmitting force for a braking in an axial movement, a threaded spindle, a tubular rod telescopically mounted with a nut threaded on said spindle with non-locking pitch, clutch means extending radially from said spindle, cooperating clutch surfaces affixed to said piston to prevent movement of said nut on said spindle, and an adjuster spring mounted to transmit force between said piston and said tubular rod to thereby open said clutch means and permit said nut to rotate on said spindle when the braking force exceeds the force of said spring.

2. Slack adjusting apparatus as defined in claim 1, wherein said adjuster spring is a cylindrical coil spring surrounding said tubular rod, a spring support axially engaging said piston and a shoulder surface on said tubular rod engaging said adjuster spring at opposite ends, and a spider sleeve being locked against rotation relative to said spring support and positioned to engage a stationary part of said cylinder after a predetermined axial distance of travel of the piston.

3. Slack adjusting apparatus as defined in claim 2 including an axial low friction bearing carried on said spindle and having a spring engaging said piston and said spindle through said bearing.

4. Slack adjusting apparatus as defined in claim 2 including an axially adjustable abutment for engaging said spider sleeve.

5. Slack adjusting apparatus as defined in claim 1 including further double acting means for permitting said nut to rotate on said spindle upon the return stroke of the piston when insufficient slack exists.

* * * * *